United States Patent [19]

Takubo et al.

[11] Patent Number: 4,733,950
[45] Date of Patent: Mar. 29, 1988

[54] DISPLAY DEVICE USING ELECTRO-OPTIC PLATE AND A MEMBRANE SWITCH

[75] Inventors: Yoneharu Takubo, Neyagawa; Yasutaka Horibe, Ibaraki; Nobue Yamanishi, Kashiwara; Eiji Fujii, Osaka; Hideyuki Okinaka, Toyonaka, all of Japan

[73] Assignee: Matsushita Electric Industrial Co., Ltd., Kadoma, Japan

[21] Appl. No.: 939,438

[22] Filed: Dec. 4, 1986

[30] Foreign Application Priority Data

Dec. 6, 1985 [JP] Japan ................... 60-275317
Dec. 17, 1985 [JP] Japan ................... 60-283474

[51] Int. Cl.⁴ .................................. G02F 1/055
[52] U.S. Cl. ............................ 350/392; 340/783
[58] Field of Search ............... 350/392, 355, 356; 340/783

[56] References Cited

U.S. PATENT DOCUMENTS

| | | |
|---|---|---|
| 3,292,171 | 12/1966 | Wilson .......................... 340/787 |
| 3,495,232 | 2/1970 | Wagner ......................... 340/712 |
| 4,113,360 | 9/1978 | Baur et al. .................... 340/783 |
| 4,158,201 | 6/1979 | Smith et al. ................... 340/783 |
| 4,170,772 | 10/1979 | Bly ............................... 340/783 |
| 4,636,786 | 1/1987 | Haertling ...................... 350/392 |

Primary Examiner—Bruce Y. Arnold
Assistant Examiner—Terry S. Callaghan
Attorney, Agent, or Firm—Wenderoth, Lind & Ponack

[57] ABSTRACT

A display apparatus using a light-transmitting ceramic plate having an electrooptic effect known as Kerr effect is disclosed. The ceramic plate is placed between two parallel polarizers having a same axis of polarization. A transparent flexible sheet faces a surface of the ceramic plate. The flexible sheet has a plurality of transparent striped electrodes on a surface facing the surface of the ceramic plate. The striped electrodes are locally brought into contact with the surface of the ceramic plate by a pressure applied by a pressure application head which is either always or intermittently pressed onto the flexible sheet. The pressure application head is movable in a direction parallel to the striped electrodes for scanning.

19 Claims, 11 Drawing Figures

DISPLAY DEVICE USING ELECTRO-OPTIC PLATE AND A MEMBRANE SWITCH

BACKGROUND OF THE INVENTION

1. Field of the Invention

The present invention relates to an information display apparatus used for an output terminal of an information processing system.

2. Description of the Prior Art

In recent years, information communications technology has made rapid progress, such as optical communication, information network system (INS) and value-added network (VAN). With the progress of such communications technology, information output terminal equipment and vigorously developed these days are soft copies represented by cathodray tubes (CRTs) and liquid-crystal displays (LCDs) and hard copies such as printers.

Since the CRTs and LCDs themselves have no storage function, the amount of information which can be displayed in one frame without dazzling the human eyes are limited. In particular, flat-plate type displays using a liquid crystal or the like have a problem (although they can be reduced in the entire size in contrast to the CRT displays). Namely, since the flat-plate type displays are driven by means of matrix electrodes, an increase in the amount of information displayed in one frame caused an increase in the number of required drive circuits, resulting in exceedingly high costs.

On the other hand, output apparatuses such as printers are capable of recording (although the information display speed thereof is relatively slow). Therefore, these output apparatuses provide a satisfactory information display capacity per frame and a relatively high resolution. However, it is necessary for these apparatuses to carry out maintenance of expendable supplies, such as ink, toner and the like. Moreover, the printed record is a hard copy which cannot be rewritten.

As described above, conventional information output terminal apparatuses include those which enable rewriting of information but per se possess no memory function and therefore have a relatively small information display capacity per frame and unsatisfactory resolution, such as CRTs and LCDs, and those which can record and hold information but need maintenance and do not enable rewriting of information, such as printers. As a means which has the functions of both of the above-described two types of information output terminal apparatuses, a sheet which enables writing of information using electrophoresis has already been proposed (A. Chiang, D. Curry, M. Zarzychi: "A Stylus Writable Electrophoretic Display Device", SID 79 Digest, pp. 45-46 (1979)), but this cannot be put into practical use because of its complicated structure.

SUMMARY OF THE INVENTION

In view of the above-described circumstances, it is a primary object of the present invention to provide a display apparatus which enables necessary information to be recorded, displayed and held for a necessary period of time and with a satisfactory picture quality at a reduced cost and a reduced power consumption and which enables rewriting of information.

The present invention uses an electrooptic effect known as Kerr effect possessed by a light-transmitting ceramic plate such as PLZT ceramic plate. When a electric potential difference is applied to a part of the light-transmitting ceramic plate, a light passed through the part causes double refraction. Thus, when the light-transmitting ceramic plate is placed between two polarizers which are disposed so that the axes of polarization thereof are equal to each other, the part where the double refraction occurred is seen as a dark dot which can be a display element of a character or graphic pattern.

A display apparatus according to the present invention comprises: two polarizers disposed in parallel with each other and to be equal in the axis of polarization to each other; a light-transmitting ceramic plate having an electrooptic effect placed in parallel with and between the two polarizers; a transparent flexible sheet facing a surface of the ceramic plate with a predetermined gap therebetween and having a plurality of transparent striped electrodes on a surface facing the surface of the ceramic plate; means for applying a voltage signal to the striped electrodes; and a pressure application head extending in a direction parallel to said flexible sheet and perpendicular to the striped electrodes and movable in a direction parallel to the striped electrodes, the pressure application head being pressed onto the flexible sheet so as to allow the striped electrodes to be locally in contact with the surface of the ceramic plate.

By virtue of the above-described arrangement, a potential difference is applied between any desired two local points on the surface of the ceramic plate so as to cause double refraction of light, thereby allowing information to be displayed through a polarizing plate. Since the flexible sheet returns to its original state after the pressure is removed, the potential difference occurring on the surface of the ceramic plate is preserved and maintained as it is by virtue of the dielectric property of the ceramic plate. In other words, the displayed information is held. By applying a pressure to the flexible sheet by means of the head without applying any voltage to the electrodes, the potential difference held on the ceramic plate surface can be canceled, that is, the displayed information can be erased.

Preferably, a reflection film may be provided on an outer surface of one of the two polarizers so that the displayed information can be seen from one direction. The pressure application head may be either always or intermittently pressed onto the flexible sheet.

As described above, the display apparatus according to the present invention enables information to be recorded, displayed and rewritten. Further, substantially no large electric power is needed through any of the recording, displaying and rewriting operations. In addition, it is possible to realize a display system with an exceedingly simple arrangement and to display information with a high resolution at a reduced cost.

The above and other objects, features and advantages of the invention will be apparant from the following description taken in connection with the accompanying drawings in which:

DESCRIPTION OF THE PREFERRED EMBODIMENTS

Figure 1A:
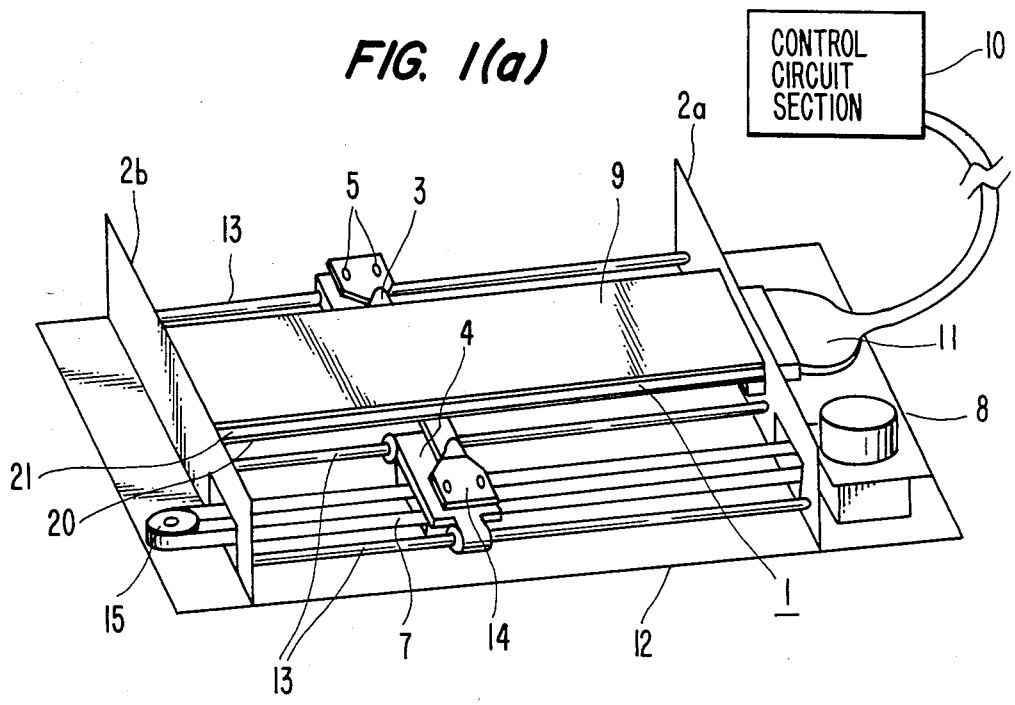
FIGS. 1(a) and 1(b) are respectively a perspective view and a front view of a display apparatus in accordance with an embodiment of the present invention.
Figure 1B:
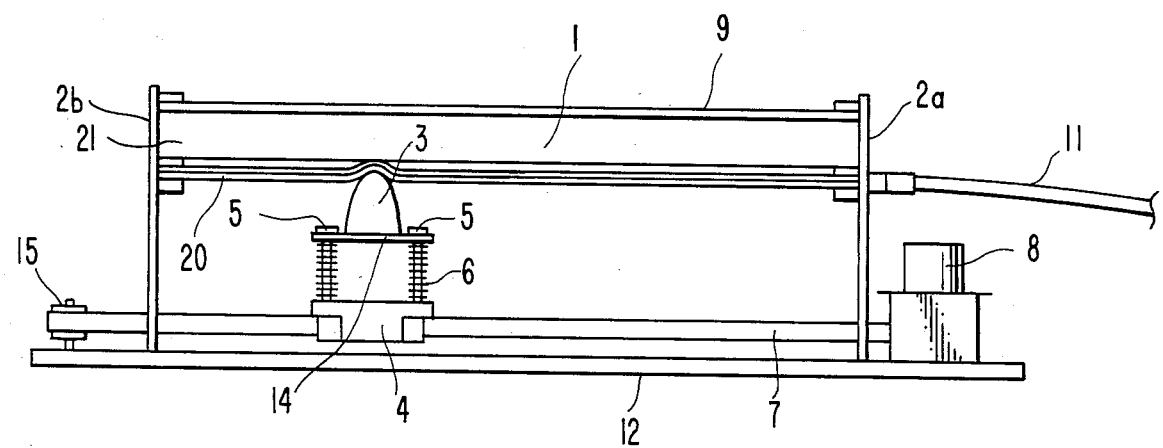

Referring to FIGS. 1(a) and 1(b) which show an arrangement of a display apparatus in according with an embodiment of the present invention, reference numberal 1 denotes a display section comprised by a light-transmitting ceramic plate 21 which exhibits the electrooptic effect known as Kerr effect, a polarizing plate 9 provided on an upper surface of the ceramic plate 21, and a flexible sheet 20 provided below the ceramic plate with a predetermined gap therebetween and having a plurality of transparent parallel striped electrodes (not shown) on a surface facing a lower surface of the ceramic plate 21. The display section 1 will be described in detail later.

The display section 1 is supported at both ends thereof by supporting plates 2a and 2b mounted on a chassis 12. A control circuit section 10 applies information signals to the electrodes on the flexible sheet 20 through a cable 11, and a drive signal to a reversible motor 8 through the cable 11.

A head carrier 4 is slidably mounted on guide rails 13 each fixed at both ends thereof to the support plates 2a and 2b. A drive belt 7 extended between the motor 8 and a pulley 15 mounted on the chassis 12 is drivably connected to the head carrier 4 so as to move the head carrier 4 along the guide rails 13 in a direction parallel to the striped electrodes.

A pressure application head 3 extending in a direction parallel to the flexible sheet 20 and perpendicular to the striped electrodes is mounted on the head carrier 4 via support members 14 which support both ends of the head 3 and are connected to the head carrier 4 via adjusting screws 5. The pressure application head 3 is urged upward by means of pressure springs 6 provided between each of the support members 14 and the head carrier 4 so that a round top edge of the head 3 presses a part of the flexible sheet 20 onto the ceramic plate 21 so as to allow the electrodes on the upper surface of the flexible sheet 20 to be locally in contact with the lower surface of the ceramic plate 21.

Figure 2:
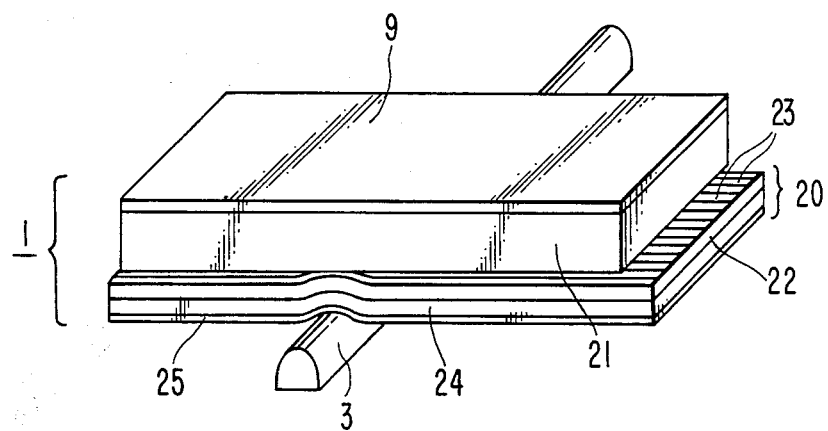
FIG. 2 is a perspective view of a display section of the display apparatus illustrated in FIGS. 1(a) and 1(b)

FIG. 2 shows an example of the display section 1. The flexible sheet 20 comprises a transparent film 22 having a plurality of transparent striped electrodes 23 extending in the direction of movement of the pressure application head 3 on a surface facing the lower surface of the light-transmitting ceramic plate 21, a polarizing film 24 provided on a lower surface of the transparent film 22, and a reflection film 25 provided on a lower surface of the polarizing film 24.

Polarization axes of the polarizing plate 9 and the polarizing film 24 are the same, for example inclined at 45° from the direction of movement of the pressure application head 3. The light-transmitting ceramic plate 21 is preferably made of PLZT ($(Pb,La)(Zr,Ti)O_3$) having a composition of La/Zr/Ti=9/65/35 which exhibits a relatively large Kerr effect. The reflection film 25 is preferably made of evaporated aluminum or polyethylene terephthalate (PET). The striped electrodes 23 are preferably made of indium-tin oxide (ITO). As an example, a width of each electrode is 50 $\mu$m, and a distance between two adjacent electrodes is 100 $\mu$m.

A reference voltage (OV, for example) is applied to every other electrodes of the striped electrodes 23, and signal voltages are applied to desired electrodes of the other electrodes of the striped electrodes 23 in synchronism with the movement of the pressure application head 3.

Figure 3:
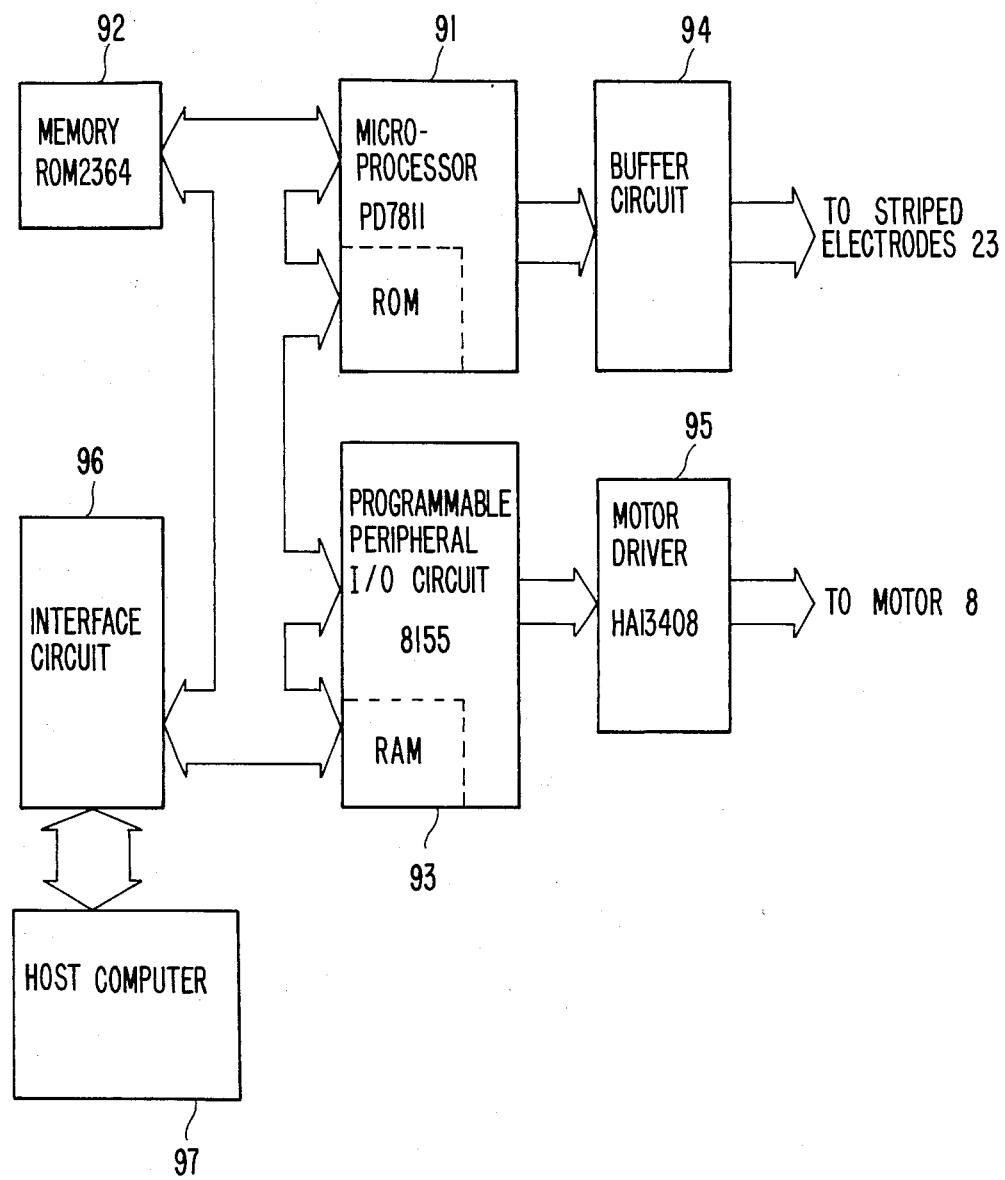
FIG. 3 is a block diagram showing an arrangement of a control circuit section of the display apparatus illustrated in FIGS. 1(a) and 1(b)
Figure 4:
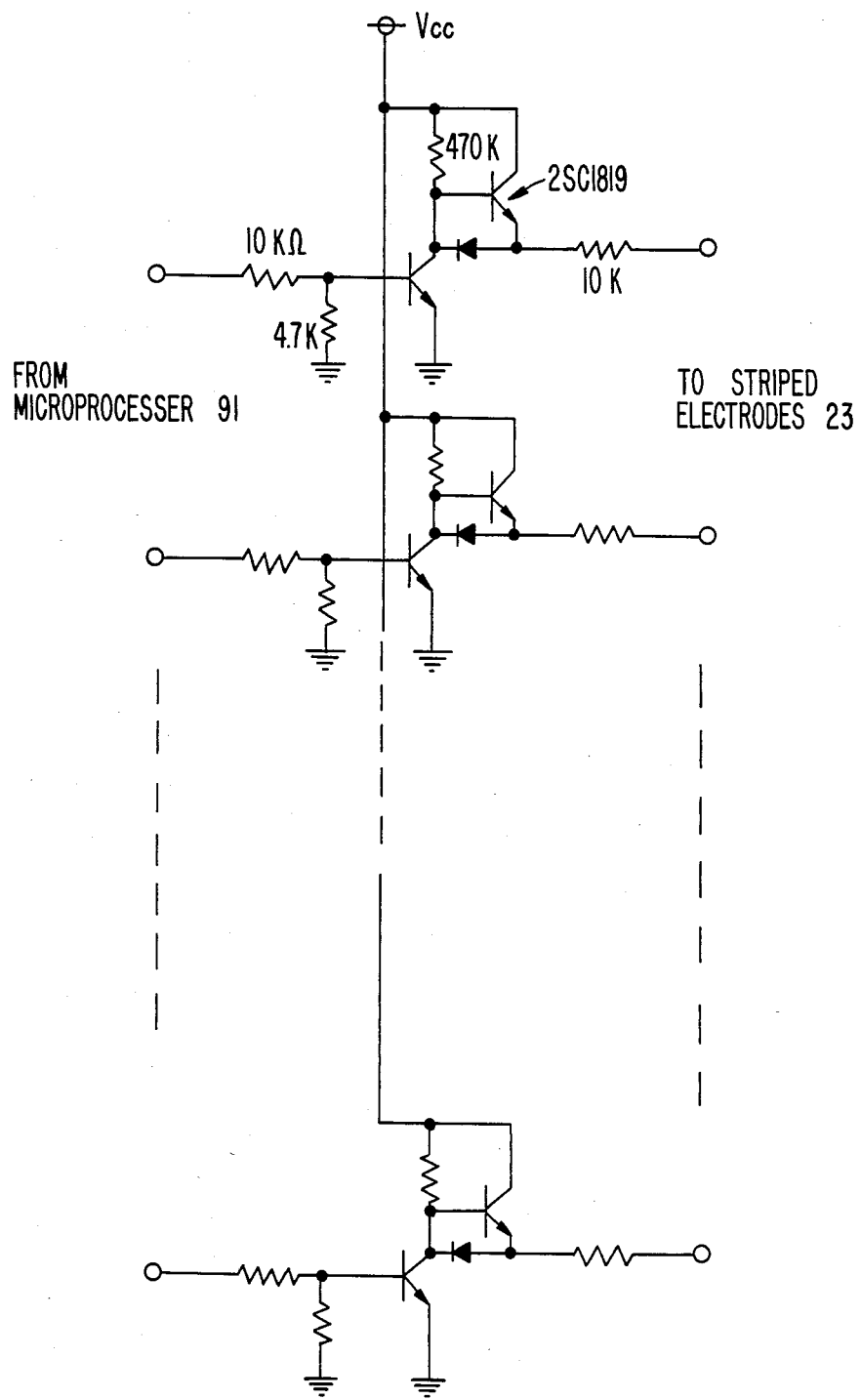
FIG. 4 is a circuit diagram of a buffer circuit in the control circuit section illustrated in FIG. 3.

FIG. 3 is a block diagram of the control circuit section 10 shown in FIG. 1(a) employed in this embodiment. As illustrated, the control circuit section 10 is constituted by a microprocessor ($\mu$PD7811)91 as a main component, with a memory (ROM 2364)92 and input-/output control circuits 93, 96. A motor driver (HA13408)95 is connected to a programmable peripheral I/O circuit (8155)93 for controlling the motor 8. The signals delivered to the striped electrodes 23 are produced by the microprocessor 91 and boosted by a buffer circuit 94 as shown in FIG. 4. The microprocessor 91 is connected to a host computer 97 through an interface circuit 96. Other than the example shown in FIGS. 3 and 4, the control circuit section 10 can be configured in various manners by using well-known electronics art.

Figure 5:
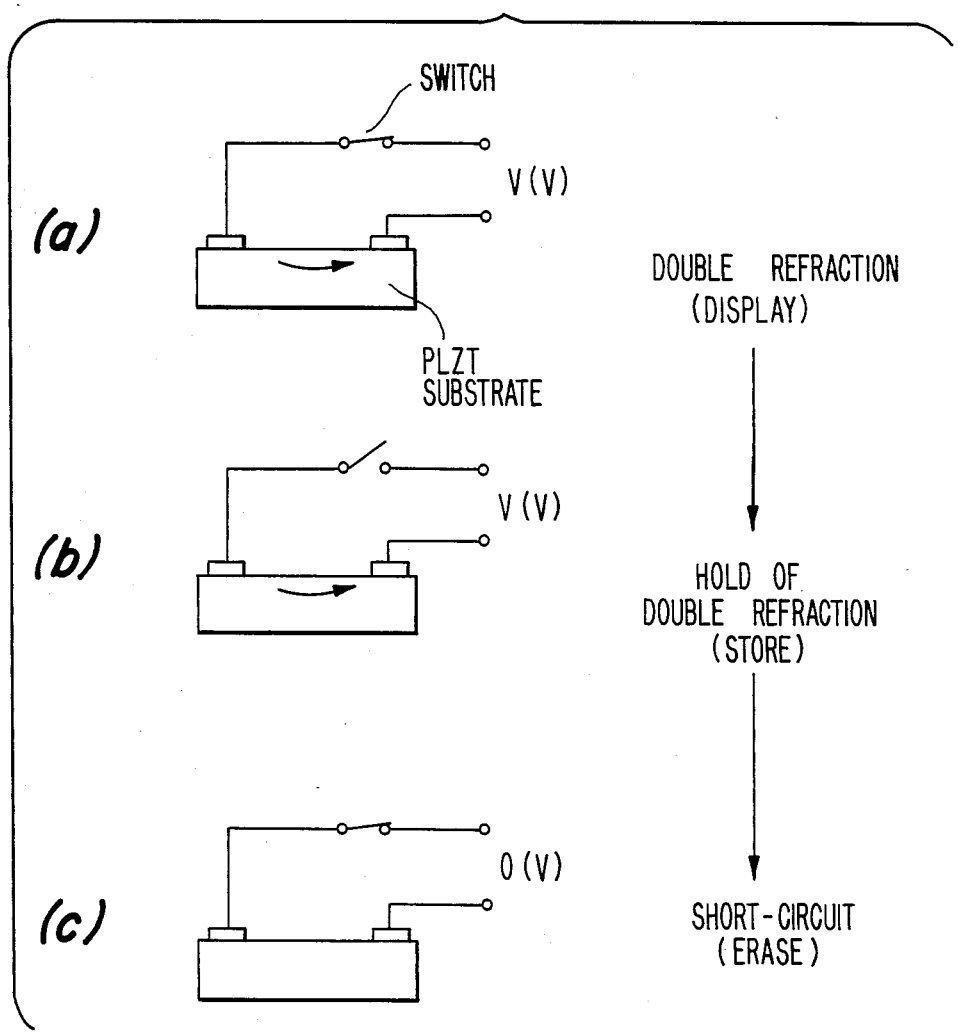
FIG. 5 is a schematic diagram showing basic recording, displaying and erasing operations of the display apparatus according to the present invention.

FIG. 5 shows the principle of the function of the PLZT plate 21 in the display apparatus according to the present invention. As illustrated in FIG. 5, when a voltage is applied between a pair of adjacent electrodes formed on the PLZT plate, double refraction occurs in the PLZT plates. Accordingly, if polarizing films are respectively disposed on the upper and lower sides of the PLZT plate, bright and dark patterns are respectively formed at a portion of the PLZT plate in which the double refraction occurs and the other portion (the state (a) in FIG. 5). In other words, information can be displayed. Then, if a switch is opened from a state wherein a voltage is being applied to the PLZT plate, the double refraction generated in the PLZT plate is held as it is (the state (b) in FIG. 5). This means that the information is stored. The stored information can be erased by short-circuiting the two electrodes (the state (c) in FIG. 5).

The switch shown in FIG. 5 corresponds to the pressure application head 3. That is, the state in which the switch is closed corresponds to the state in which the striped electrodes 23 on the flexible sheet 20 are in contact with the light-transmitting ceramic plate 21 by the pressure of the pressure application head 3. By moving, or scanning, the pressure application head 3 in one direction and applying the signal voltages to desired electrodes of the striped electrodes 23 (except the reference voltage applied electrodes) in synchronism with the movement of the pressure application head 3, the state (a) in FIG. 5 is sequentially produced, whereby information display can be realized. The portion of the ceramic plate 21 where the pressure application head 3 has passed maintains the state (b) in FIG. 5. The state (c) in FIG. 5 can be obtained by applying the reference voltage to both of the signal applied electrodes and the reference voltage applied electrodes in synchronism with the movement of the pressure application head 3.

Through the inventor's experiments, the information stored state (the state (b) in FIG. 5) can be maintained for at least three days at a room temperature without degrading the display quality. The display contrast at least 10 can be obtained. When the reference voltage is 0 [V], a preferable level of the signal voltage is 200 [V].

In the above described embodiment, the pressure application head 3 is always pressed against the flexible sheet 20. But, the pressure application head 3 may be arranged to be selectively pressed against the flexible sheet 20. An example such arrangement is shown in FIG. 6.

Figure 6:
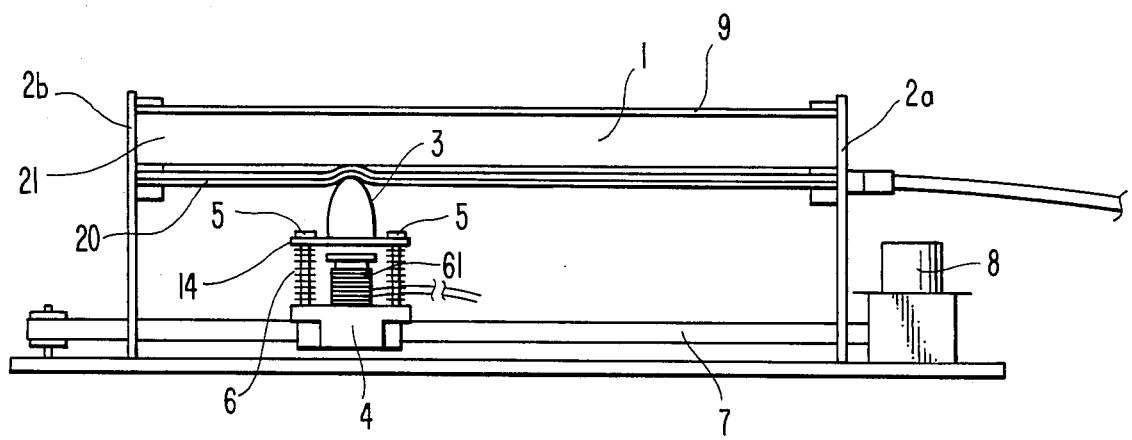
FIG. 6 is a front view of a display apparatus in accordance with a modified embodiment of the present invention.

Referring to FIG. 6, an electromagnet 61 is provided on the head carrier 4 for selectively attracting the support member 14 so that the head 3 is moved downward to be apart from the flexible sheet 20. With this arrangement, the pressure application head 3 can be moved to any desired position without affecting the stored information. Other arrangements for allowing the pressure application head 3 to be intermittently pressed against the flexible sheet 20 may be possible by using known mechanical techniques.

Figure 7:
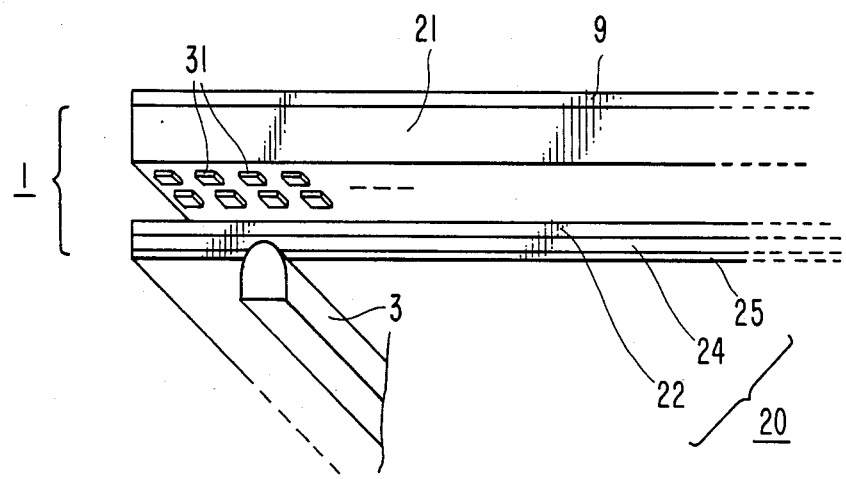
FIG. 7 is a partial perspective view of a modified display section of the display apparatus illustrated in FIGS. 1(a) and 1(b) or FIG. 6.

FIG. 7 shows a modified arrangement of the display section 1. Reference numeral 31 denotes a plurality of transparent electrode pieces formed on the lower surface of the light-transmitting ceramic plate 21. In this arrangement, ITO transparent electrode is deposited on the lower surface of the ceramic plate 21 by evaporation, and then formed into small square pieces of 50 $\mu m \times 50$ $\mu m$ which are arranged at intervals of 50 $\mu m$ by photolitography technique. A potential difference is applied to the ceramic plate 21 through the electrode pieces 31 from the striped electrodes 23 (not shown in this figure). An inequality of a potential difference caused by an inequality of the contacting pressure between the ceramic plate 21 and the striped electrodes 23 can be decreased. In addition, since the double refraction occuring in the ceramic plate 21 is divided into units of 50 $\mu m$, the blur of dots is also somewhat remedied.

Figure 8:
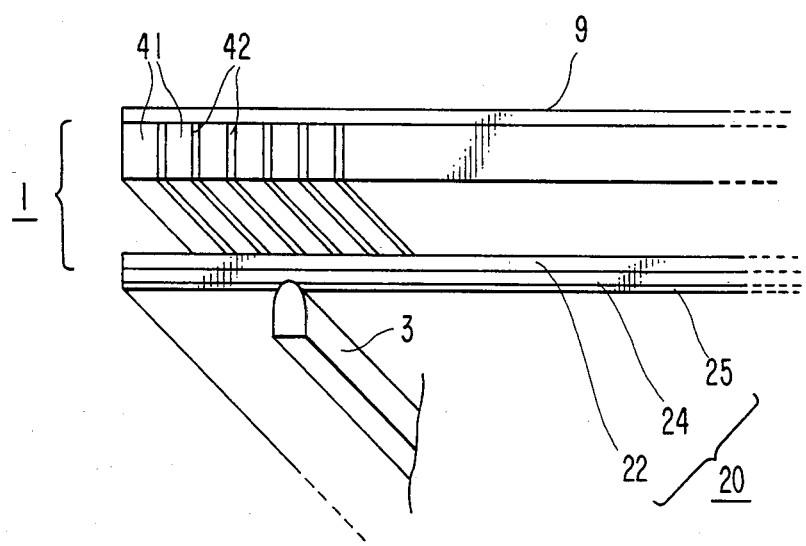
FIG. 8 is a partial perspective view of another modified display section of the display apparatus illustrated in FIGS. 1(a) and 1(b) or FIG. 6.

FIG. 8 shows another modified arrangement of the display section 1. Reference numeral 41 denotes a plurality of light-transmitting ceramic strips, and numeral 42 denotes bonding layers each bonding each pair of adjacent two of the ceramic strips 41. The ceramic strips 41 and the bonding layers 42 are arranged at a pitch of 120 $\mu m$, the former having a width of 100 $\mu m$, and the latter having a width of 20 $\mu m$. The cermic strips 41 are periodically arranged through the bonding layers 42. Therefore, the dots in a display state are effectively and reliably separated from each other at the interval of arrangement of the ceramic strips 41 with respect to the head scanning direction and at the electrode pitch of the striped electrodes 23 (not shown in this figure) in a direction perpendicular to the head scanning direction, whereby the display quality can be improved. For instance, in the case of the ceramic plate 21 which is designed such as that in FIG. 2, it was experimentally found that the maximum number of dots per millimeter that can be resolved in the head scanning direction is 8, whereas the arrangement in FIG. 8 enables such limitation on the number of resolvable dots to be eliminated.

Figure 9:
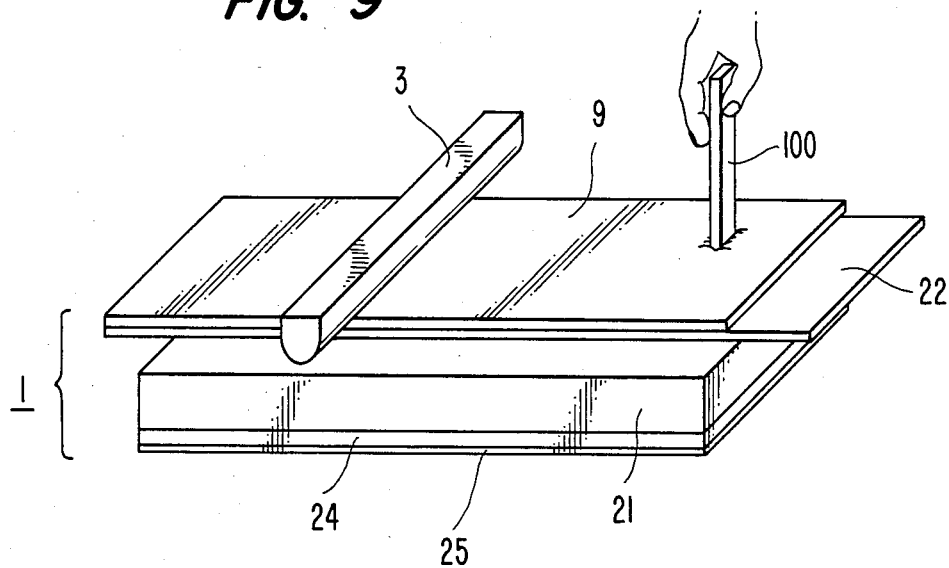
FIG. 9 is a perspective view of a display section of a display apparatus in accordance with another modified embodiment of the present invention.

FIG. 9 shows another arrangement of the display section 1 and the pressure application head 3. The polarizing plate 9 is separated from the ceramic plate 21, and the sheet composed of the polarizing film 24 and the reflection film 25 is integrated with the ceramic plate 21. The transparent film 22 is provied on the lower surface of the polarizing plate 9. The striped electrodes 23 (not shown) are formed on the lower surface of the transparent film 22. The polarizing plate 9 should be flexible. The pressure application head 3 is disposed above the polarizing plate 9 and is pressed onto the upper surface of the polarizing plate 9 so that the striped electrodes on the lower surface of the transparent film are in contact with the upper surface of the ceramic plate 21. With this arrangement, a desired part of the stored information can be easily erased manually by using a finger-held member 100 as shown.

Figure 10:
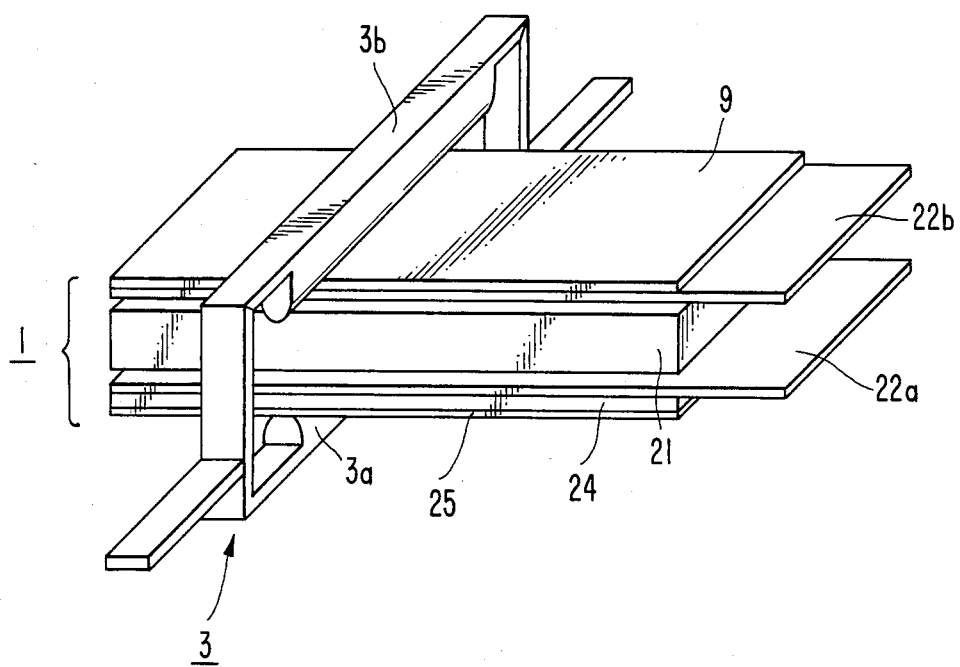
FIG. 10 is a perspective view of a display section of a display apparatus in accordance with still another modified embodiment of the present invention.

FIG. 10 shows still another arrangement of the display section 1 and the pressure application head 3. Two flexible sheets are respectively disposed above and below the light-transmitting ceramic plate 21. The lower flexible sheet is comprised, in the same way as the above described flexible sheet 20, by a transparent film 22a having on an upper surface thereof the striped electrodes, the polarizing film 24, and the reflection film 25. The upper flexible sheet is comprised, in the same way as the arrangement of FIG. 9, by the polarizing plate 9 and a tranparent film 22b having on a lower surface thereof the striped electrodes each of which is positioned to be right above each of the striped electrodes of the transparent film 22a. The signal voltages are applied to the corresponding pairs of the upper and lower striped electrodes. The pressure application head 3 has lower and upper head elements 3a and 3b which are respectively pressed onto the lower and upper flexible sheets. With this arrangement, the level of the signal voltage can be reduced compared with the foregoing embodiments. An experimental result showed that the preferable level of the signal voltage is 120 [V] when the reference voltage is 0 [V].

It is needless to say, but any of the arrangements shown in FIGS. 7 and 8 can be applicable to any of the arrangements shown in FIGS. 9 and 10. Further, modification of the head position as shown in FIG. 9 or 10 can be easily realized with a minor design change of the arrangement shown in FIGS. 1(a) and 1(b). Moreover, it should be understood that various other changes and modifications are possible within the scope of the present invention described in the appended claims. Therefore, the present invention should not be understood to be limited to the above exemplary embodiments.

What is claimed is:

1. A display apparatus comprising:
   two polarizers disposed in parallel with each other and having their axes of polarization aligned;
   a light-transmitting ceramic plate having an electrooptic effect placed in parallel with and between said two polarizers;
   a transparent flexible sheet facing a surface of said ceramic plate with a predetermined gap therebetween and having a plurality of transparent striped electrodes on a surface facing said surface of said ceramic plate;
   means for applying a voltage signal to said striped electrodes; and a pressure application head extending in a direction perpendicular to said striped electrodes and movable in a direction parallel to said striped electrodes, said pressure application head being either always or intermittently pressed onto said flexible sheet so as to allow said striped electrodes to be locally in contact with said surface of said ceramic plate.

2. The apparatus as in claim 1, wherein said light-transmitting ceramic plate is made of a PLZT ((Pb,La)(Zr,Ti) $O_3$)).

3. The apparatus as in claim 1, wherein said means for applying a voltage signal applies a reference voltage to every other electrode of said striped electrodes, and a predetermined signal voltage to desired electrodes of the other of said striped electrodes according to an information signal in synchronism with the movement of said pressure application head.

4. A display apparatus comprising:
a light-transmitting ceramic plate having an electrooptic effect;
a polarizing plate provided on an upper surface of said ceramic plate;
a flexible sheet facing a lower surface of said ceramic plate with a predetermined gap therebetween and comprising: a transparent film having on an upper surface thereof a plurality of transparent striped electrodes; a polarizing film provided on a lower surface of said transparent film so that the axis of polarization of said polarizing film is aligned with that of said polarizing plate; and a reflection film provided on a lower surface of said polarizing film; and
a pressure application head extending in a direction parallel to said flexible sheet and perpendicular to said striped electrodes and movable in a direction parallel to said striped electrodes, said pressure application head being either always or intermittently pressed onto a lower surface of said flexible sheet so as to allow said striped electrodes to be locally in contact with said lower surface of said ceramic plate.

5. The apparatus as in claim 4, wherein said light-transmitting ceramic plate is made of a PLZT ((Pb,La)(Zr,Ti) $O_3$)).

6. The apparatus as in claim 4, wherein said means for applying a voltage signal applies a reference voltage to every other electrode of said striped electrodes, and a predetermined signal voltage to desired electrodes of the other of said striped electrodes according to an information signal in synchronism with the movement of said pressure application head.

7. The apparatus as in claim 4, further comprising a plurality of transparent dot-pattern electrodes provided on said lower surface of said ceramic plate.

8. The apparatus as in claim 4, wherein said ceramic plate is divided to a plurality of separated strips each extending perpendicularly to said striped electrodes, each adjacent two of said plurality of strips being bonded by a bonding layer.

9. A display apparatus comprising:
a light-transmitting ceramic plate having an electrooptic effect;
a first polarizing film provided on a lower surface of said ceramic plate;
a reflection film provided on a lower surface of said first polarizing film;
a flexible sheet facing an upper surface of said ceramic plate with a predetermined gap therebetween and comprising: a transparent film having on a lower surface thereof a plurality of transparent striped electrodes; and a second polarizing film provided on an upper surface of said transparent film so that the axis of polarization thereof is aligned with that of said first polarizing film; and
a pressure application head extending in a direction parallel to said transparent film and perpendicular to said striped electrodes and movable in direction parallel to said striped electrodes, said pressure application head being either always or intermittently pressed onto an upper surface of said flexible sheet so as to allow said striped electrodes to be locally in contact with said upper surface of said ceramic plate.

10. The apparatus as in claim 9, wherein said light-transmitting ceramic plate is made of a PLZT ((Pb,La)(Zr,Ti) $O_3$)).

11. The apparatus as in claim 9, wherein said means for applying a voltage signal applies a reference voltage to every other electrode of said striped electrodes, and a predetermined signal voltage to desired electrodes of the other of said striped electrodes according to an information signal in synchronism with the movement of said pressure application head.

12. The apparatus as in claim 9, further comprising a plurality of transparent dot-pattern electrodes provided on said upper surface of said ceramic plate.

13. The apparatus as in claim 9, wherein said ceramic plate is divided to a plurality of separated strips each extending perpendicularly to said striped electrodes, each adjacent two of said plurality of strips being bonded by a bonding layer.

14. A display apparatus comprising:
a light-transmitting ceramic plate having an electrooptic effect;
a first flexible sheet facing a lower surface of said ceramic plate with a predetermined gap therebetween and comprising: a first transparent film having on an upper surface thereof a plurality of first transparent striped electrodes; a first polarizing film provided on a lower surface of said first transparent film; and a reflection film provided on a lower surface of said first polarizing film;
a second flexible sheet facing an upper surface of said ceramic plate with a predetermined gap therebetween and comprising: a second transparent film having on a lower surface thereof a plurality of second transparent striped electrodes extending in a same direction as said first transparent striped electrodes; and a second polarizing film provided on an upper surface of said second transparent film so that the axis of polarization thereof is aligned with that of said first polarizing film; and
a pressure application head having: a first head element extending in a direction parallel to said first flexible film and perpendicular to said first transparent striped electrodes and being either always or intermittently pressed onto a lower surface of said first flexible sheet so as to allow said first transparent striped electrodes to be locally in contact with said lower surface of said ceramic plate; and a second head element disposed in parallel with said first head element right above said first head element and being either always or intermittently pressed onto an upper surface of said second flexible sheet so as to allow said second transparent striped electrodes to be locally in contact with said upper surface of said ceramic plate, said pressure application head being movable in a direction parallel to said transparent striped electrodes.

15. The apparatus as in claim 14, wherein said first and second transparent striped electrodes are aligned in a vertical direction.

16. The apparatus as in claim 14, wherein said light-transmitting ceramic plate is made of a PLZT $((Pb,La)(Zr,Ti) O_3))$.

17. The apparatus as in claim 14, wherein said means for applying a voltage signal applies a reference voltage to every other electrode of said striped electrodes, and a predetermined signal voltage to desired electrodes of the other of said striped electrodes according to an information signal in synchronism with the movement of said pressure application head.

18. The apparatus as in claim 14, further comprising a plurality of transparent dot-pattern electrodes provided on each of said upper and lower surfaces of said ceramic plate.

19. The apparatus as in claim 14, wherein said ceramic plate is divided to a plurality of separated strips each extending perpendicularly to said striped electrodes, each adjacent two of said plurality of strips being bonded by a bonding layer.

* * * * *